United States Patent
Heshmat

(10) Patent No.: US 10,585,284 B1
(45) Date of Patent: Mar. 10, 2020

(54) SYSTEMS AND METHODS TO PROVIDE AN INTERACTIVE ENVIRONMENT OVER A WIDE FIELD OF VIEW

(71) Applicant: Meta View, Inc., San Mateo, CA (US)

(72) Inventor: Barmak Heshmat, San Mateo, CA (US)

(73) Assignee: Meta View, Inc., San Mateo, CA (US)

( * ) Notice: Subject to any disclaimer, the term of this patent is extended or adjusted under 35 U.S.C. 154(b) by 0 days.

(21) Appl. No.: 15/816,842

(22) Filed: Nov. 17, 2017

(51) Int. Cl.
*G02B 27/01* (2006.01)
*G06T 11/60* (2006.01)
*G02B 26/08* (2006.01)
*F21V 8/00* (2006.01)

(52) U.S. Cl.
CPC ....... *G02B 27/0172* (2013.01); *G02B 6/0035* (2013.01); *G02B 26/0833* (2013.01); *G06T 11/60* (2013.01); *G02B 2027/014* (2013.01); *G02B 2027/0123* (2013.01)

(58) Field of Classification Search
CPC ........ G02B 27/0172; G02B 2027/0123; G02B 2027/0125; G02B 2027/014; G02B 2027/0174; G06T 11/60; G06T 19/006
See application file for complete search history.

(56) References Cited

U.S. PATENT DOCUMENTS

| | | | |
|---|---|---|---|
| 9,541,757 B2 | 1/2017 | Yokoyama | |
| 2002/0181115 A1 | 12/2002 | Massof | |
| 2007/0188837 A1 | 8/2007 | Shimizu | |
| 2009/0128922 A1 | 5/2009 | Justis | |
| 2010/0277803 A1* | 11/2010 | Pockett | G02B 27/0172 359/567 |
| 2011/0075257 A1 | 3/2011 | Hua | |
| 2012/0033853 A1 | 2/2012 | Kaneda | |
| 2012/0056896 A1 | 3/2012 | Border | |
| 2013/0242392 A1* | 9/2013 | Amirparviz | G02B 27/0172 359/485.05 |
| 2014/0043227 A1 | 2/2014 | Skogoe | |
| 2014/0168260 A1* | 6/2014 | O'Brien | G09G 5/377 345/633 |
| 2014/0204438 A1 | 7/2014 | Yamada | |
| 2015/0049120 A1 | 2/2015 | He | |
| 2015/0253487 A1* | 9/2015 | Nichol | G02B 6/0036 362/610 |

(Continued)

FOREIGN PATENT DOCUMENTS

DE 102014013320 3/2016

OTHER PUBLICATIONS

Hainich, Rolf R., and Oliver Bimber, Displays: Fundamentals and Applications, CRC Press, 2017, pp. 553-558.

(Continued)

*Primary Examiner* — Jeffery A Brier

(57) ABSTRACT

Systems and methods to provide an interactive environment are presented herein. The system may include one or more of a device configured to be installed on a user's head, an image-forming component, one or more physical computer processors, and/or other components. The image-forming component may be configured to generate light rays to form images. The light rays may be reflected off an optical element towards a user's eye. The light rays may be transmitted back through a portion of the image-forming component before reaching the eye.

10 Claims, 10 Drawing Sheets

(56) References Cited

U.S. PATENT DOCUMENTS

| | | |
|---|---|---|
| 2015/0332506 A1 | 11/2015 | Aratani |
| 2015/0363978 A1* | 12/2015 | Maimone .......... G02B 27/0172 |
| | | 345/633 |
| 2016/0026253 A1 | 1/2016 | Bradski |
| 2016/0077336 A1 | 3/2016 | Hainich |
| 2016/0116745 A1 | 4/2016 | Osterhout |
| 2016/0131903 A1 | 5/2016 | Kollin |
| 2016/0187661 A1 | 6/2016 | Yajima |
| 2016/0370855 A1 | 12/2016 | Lanier |
| 2017/0019562 A1 | 1/2017 | Furuta |
| 2017/0038593 A1* | 2/2017 | Travers ................. G02B 27/01 |
| 2017/0109562 A1 | 4/2017 | Shroff |
| 2017/0184848 A1 | 6/2017 | Vallius |
| 2017/0235143 A1 | 8/2017 | Chi |
| 2017/0315367 A1 | 11/2017 | Maruyama |
| 2018/0203231 A1* | 7/2018 | Glik ..................... G02B 3/0043 |
| 2018/0292653 A1* | 10/2018 | Tervo ....................... G02B 6/34 |

OTHER PUBLICATIONS

Draft Appeal Brief Under 37 CFR 41.31(a)(1), U.S. Appl. No. 14/852,573, dated Jan. 30, 2018 (27 pages).

Notice of Appeal From the Examiner to the Board of Patent Appeals and Interferences, U.S. Appl. No. 14/852,573, dated Jan. 30, 2018 (2 pages).

Final Office Action, U.S. Appl. No. 14/852,573, dated Nov. 28, 2017 (10 pages).

* cited by examiner

SYSTEMS AND METHODS TO PROVIDE AN INTERACTIVE ENVIRONMENT OVER A WIDE FIELD OF VIEW

FIELD OF THE INVENTION

The systems and methods described herein relate to providing an interactive environment, such as an augmented reality environment and/or a virtual reality environment.

BACKGROUND OF THE INVENTION

There are many types of vision systems that provide virtual and/or augmented reality (AR) displays. In particular, wearable technology such as head mounted displays (HMD) are becoming more popular. Currently, some AR displays have a limited field-of-view, resulting in a less immersive interactive experience for the user.

SUMMARY

One or more implementations of the systems and methods described herein may be configured to provide an interactive environment. Devices that provide the interactive environment may suffer from a narrower field-of-view than the natural field-of-view for an eye, depending on the technology those devices utilize for displaying the interactive environment for the user. A narrower field-of-view often correlates to an inferior user experience, as the small field of view may require the user to move his or her head and/or pupils to view more virtual content in the surrounding virtual world. As such, it is desirable to utilize an optical engine configured to present a wide field-of-view of an interactive virtual world, which at the same time has a form factor closely approximating that of normal eyeglasses as much as possible. One or more implementations of the system presented herein may be configured to solve this problem and/or other problems. By way of non-limiting illustration, sets of components may be arranged to provide a wide field-of-vision for viewing the interactive space.

An interactive environment may include one or both of a virtual reality environment and/or an augmented reality environment. An augmented reality environment may include views of images forming virtual content superimposed over views of a real-world environment. A virtual reality environment may include views of a virtual environment.

A system configured to provide an interactive environment may include one or more devices configured to be installed on a head of a user, one or more physical computer processors, one or more image-forming components, and/or other components.

In some implementations, one or more of the one or more physical computer processors, one or more image-forming components, and/or other components may be included in the headset. The headset may be configured to be installed (e.g., worn) on a head of a user. By way of non-limiting illustration, headset may include one or more of a head-mounted display (HMD), glasses, and/or other devices.

In some implementations, an image-forming component may be configured to present images to the user. The image-forming component may be configured to generate light rays to form images. The image-forming component may be configured such that when the device is installed on the head of the user, the images may be presented to the user. The image-forming component may be configured such that the images may be superimposed over a view of the real world to generate an interactive environment. The image forming component may include one or more of a light-providing component, an optical element, and/or other components. The light-providing component may be configured to generate light rays to form images. The optical element may be configured to receive the light rays generated by the light-providing component and guide the light rays to an eye of the user to present the images. The light-providing component may be positioned between the eye and the optical element when the device is installed on the head of the user. The light rays generated by the light-providing component may be directed away from the eye and towards the optical element. The guidance of the light rays to the eye by the optical element may be facilitated by reflection of the light rays off the optical element. The light rays reflected off the optical element may be directed back through the light-providing component. The light may pass through the light-providing component and enter the user's eye.

The one or more physical processor may be configured by machine-readable instructions. The machine-readable instructions may include one or more of a control component and/or other components.

In some implementations, the control component may be configured to control the image-forming component to generate the light rays to form the images of virtual content. In some implementations, the control component may be configured to control the light-providing component to affect light rays returning from an optical element. The color, brightness, intensity, direction, or other features of light rays returning from the optical element may be affected by the light-providing component.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
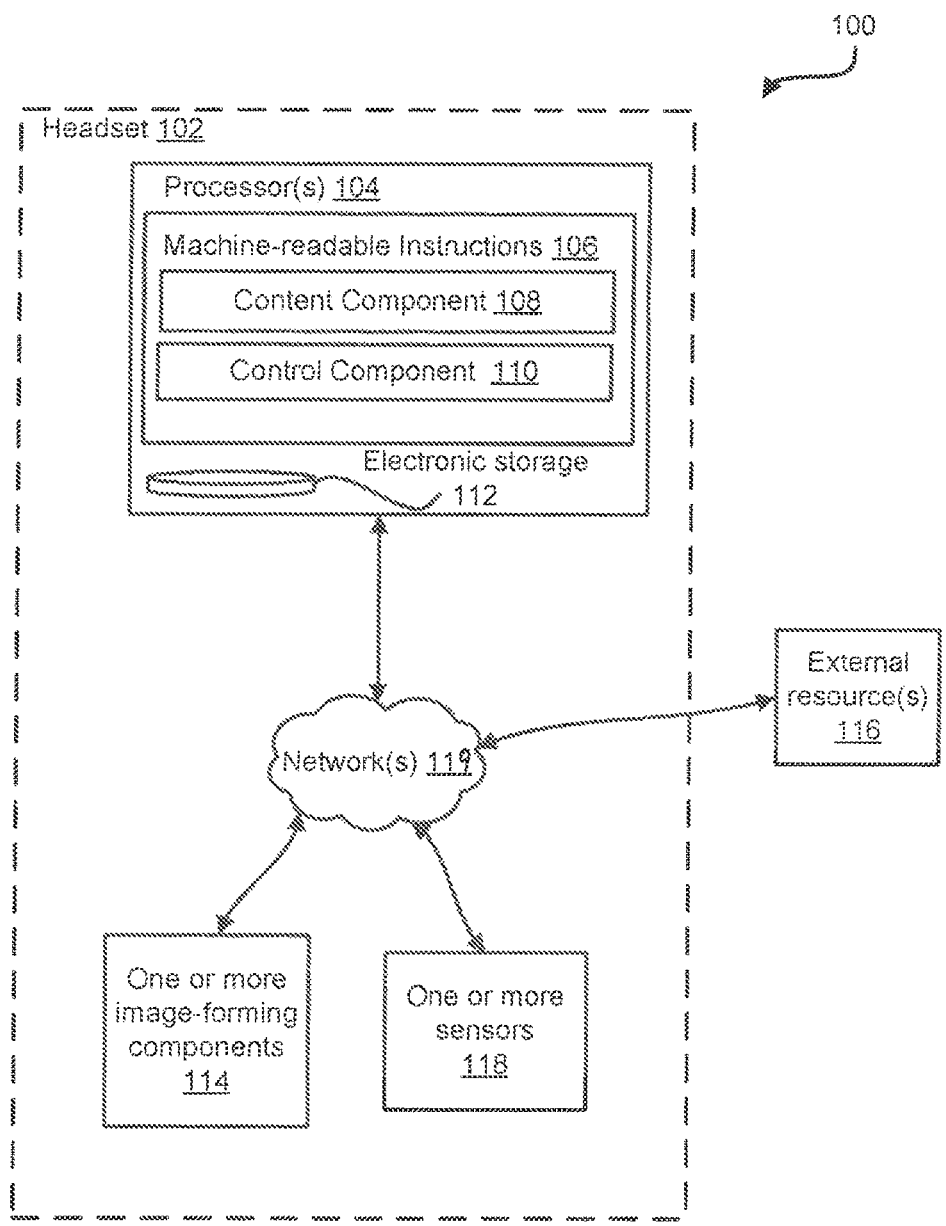
FIG. 1 illustrates a system configured to provide an interactive environment, in accordance with one or more implementations.

FIG. 1 shows a system 100 configured to provide an interactive environment, in accordance with one or more implementations. An interactive environment may include one or both of an augmented reality environment and/or a virtual reality environment. An augmented reality environment may include views of images superimposed over the views of the real-world. A virtual reality environment may include views of virtual content within a virtual environment. The terms "space" and "environment," in the context of an interactive environment, may be used interchangeably herein.

The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form or perceive coherent images. Images may include virtual content. Virtual content may include one or more virtual objects, and/or other content. As a result, the properties of the human perception may be exploited through visual systems, as described herein, employing hardware and/or software architectures to form virtual content that may be located and/or perceived to be located in the real-world environment by virtue of neuroscience principles.

It is noted that "field-of-view" may refer generally to a horizontal field-of-view in one or both of monocular or binocular vision. It is further noted that the term "horizontal" may refer to a reference line or plane that may be orthogonal to a user's head position and/or orthogonal to a local gravity vector.

The field-of-view of devices configured to provide an interactive environment may be physically constrained by the device itself. When images are presented close to a user, the field-of-view may be drastically reduced. Field-of-view may be in direct competition with minimizing the amount of space an device inhabits. Instead, in some implementations of the systems and methods presented herein, light rays forming an image of virtual content may be directed towards a reflective, or semi-reflective, optical element. The optical element may be configured to reflect the light rays into the eye from a greater distance than directly directing the light rays into an eye. This increased distances provides greater eye relief. Eye relief may be the distance from a surface of a lens within which the user's eye can obtain the full viewing angle. Once a user's eye is outside this distance, a reduced field-of-view may occur. Moreover, a light-providing component may further expand or otherwise affect the light rays coming back towards the eye.

Referring to FIG. 1, system 100 may include one or more of a headset 102, one or more physical computer processors 104, one or more image-forming components 114, one or more sensors 118, and/or other components. A sensor may be incorporated into a camera and/or other devices. In some implementations, an individual sensor of one or more sensors 118 may comprise one or more of an IR sensor, an image sensor, a depth sensor, and/or other sensors. An image sensor may be incorporated into a camera and/or other devices.

In some implementations, a depth sensor may be configured to generate output signals conveying distance of real-world objects and/or surfaces from depth sensor. By way of non-limiting illustration, depth sensor may generate output signals conveying a distance of a user's hands and/or at what depth the user may be interacting with virtual content. The depth sensor may comprise one or more of a time-of-flight sensor, a structured light sensor, an unstructured light sensor, an active stereo pair, a passive stereo pair, and/or other depth sensing devices.

In some implementations, an image sensor may be configured to generate output signals conveying visual information and/or other information. Visual information may define visual content within a field of view of the image sensor. The visual content may include depictions of objects and/or surfaces present in the real world. In some implementations, the visual information may specify visual content in the form of pixels in an image. Pixels may be defined by one or more of location (e.g., two-dimensional coordinate on an image plane), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

In some implementations, images generated by one or more image-forming components 114 of system 100 may be rendered to be perceived at a given distance from the user. Images may be presented to individual eyes as stereo image pairs. A stereoscopic image pair spacing and/or disparity of the images presented independently to each eye may be specified. In some implementations, one or more image-forming components 114 generating images forming the virtual content may be configured such that a focal distance of the images presented to a user may be fixed.

In some implementations, one or more components of system 100 may be included with and/or otherwise held by headset 102. The headset 102 may be configured to be installed (e.g., worn) on a head of a user. By way of non-limiting illustration, headset 102 may include one or more of a head-mounted display (HMD) (see, e.g., FIG. 12), glasses, and/or other devices.

In some implementations, one or more components of system 100 may be included in one or more devices external to headset 102. For example, one or more components may be included in one or more of a desktop computer, a laptop computer, other mobile computer configurations, and/or other devices. By way of non-limiting illustration, one or more physical computer processors 104 and/or other components may be included in a mobile computing device external to headset 102. The headset 102 may be tethered and/or otherwise connected to one or more external devices. Such connection may be wired (e.g., USB and/or other wired connection) and/or wireless (e.g., Bluetooth, Wi-Fi, and/or other wireless connection).

Figure 12:
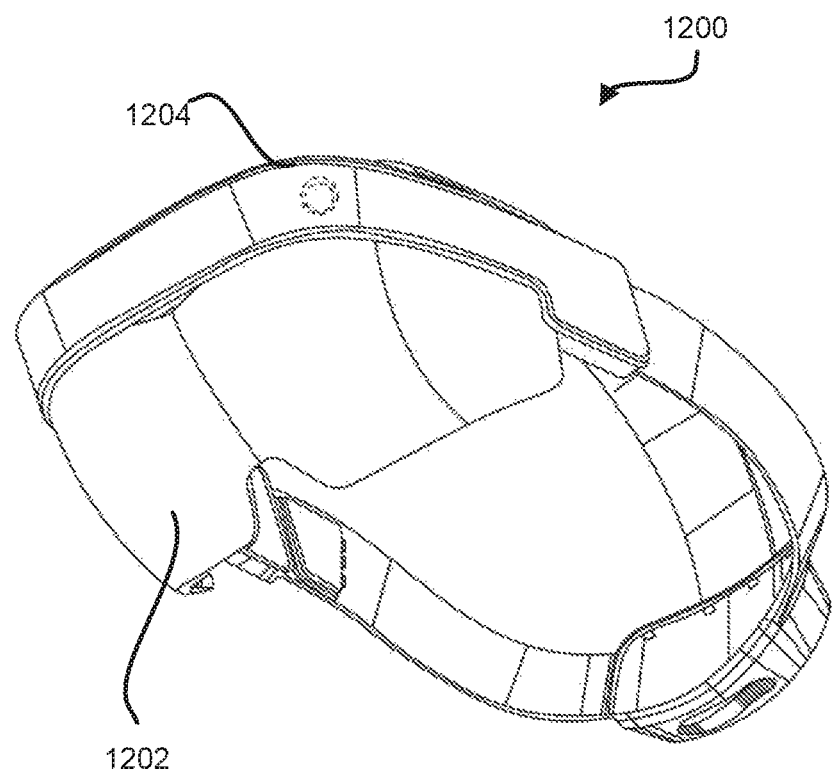
FIG. 12 illustrates an exemplary head-mounted display.

Referring now to FIG. 12, in some implementations, a headset (e.g., headset 102 in FIG. 1) may comprise an HMD 1200. One or more components of system 100 (FIG. 1) may be held by and/or comprise part of HMD 1200. By way of non-limiting illustration, one or more optical elements of individual image-forming components may comprise at least part of a visor portion 1202 of an HMD 1200. One or more of one or more physical computer processors, one or more light-providing components, one or more light-generating components, one or more waveguides, one or more displays, one or more diffractive surfaces, and/or other components may be incorporated into a housing portion 1204 and/or other portions of HMD 1200.

Returning to FIG. 1, individual image-forming components of one or more image-forming components 114 may be configured to generate light rays to form images. The individual image-forming component may be configured such that when headset 102 is installed on the head of the user, the images are presented to the user and the images are superimposed over the view of the real world. The images may be perceived within a three-dimensional light field within a viewing user's field-of-view. Images may be focused at one or more focal planes within the three-dimensional light field.

Individual ones of one or more image-forming components 114 may include one or more of one or more light-providing components, one or more optical elements, and/or other components. In some implementations, an individual light-providing component may be arranged on a headset to direct light rays towards one or more optical elements. The light may be reflected off the optical element such that the light may be directed back through the light-providing component before reaching the user's eye(s). The one or more image-forming components 114 may be configured such that images may be superimposed over a view of the real world to create an interactive environment. In some implementations, images may be presented individually to each eye of the user as stereo image pairs.

A light-providing component may comprise one or more of a light-generating component, a display, a waveguide, a diffractive surface, and/or other light-providing components.

A light-generating component may comprise one or more of a light source, a beam splitter device, a reflective surface, a micromirror, and/or other components.

A light source may comprise one or more of a red, green, blue (RGB) light-emitting diode (LED), a high power white LED, a laser diode, a feed light engine, an image engine, a liquid crystal on silicon (LCOS) microdisplay, a microdisplay, and/or other light sources.

A beam splitter device may comprise one or more of a beam splitter, a beam splitter surface, a set of one or more micro beam splitters to turn light into RGB, and/or other beam splitters. A micromirror may comprise one or more of a MEMS scanning micromirror and/or other micromirrors. A tunable lens may be added after the micromirror.

A display may be transparent or non-transparent. A display may be emissive or non-emissive. A display may be curved or flat. In some implementations, a display may be between 2-4 centimeters away from an eye. A display may comprise one or more of a LED array with gaps between individual LEDs, a liquid crystal display (LCD), a thin-film-transistor (TFT) LCD, an organic light-emitting diode (OLED), an LCD with a backlight, and/or other displays. The LED array with gaps between individual LEDs may have a gap between the range of 20 microns to 200 microns. A display may have a color matrix filter. A display may be on a transparent substrate or a see-through mesh.

A waveguide may be curved or flat. A waveguide may comprise one or more of a wedge-type waveguide, a diffractive waveguide, a holographic waveguide, a geometrical waveguide, a waveguide outputting white light, a waveguide outputting sequential RGB, a waveguide with an angled output, a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. In some implementations, optical coupling features may comprise one or more coupling prisms and/or other optical coupling feature. Light rays coupled into a waveguide may be propagated through the waveguide and directed out of the waveguide towards one or more eyes of a user. A waveguide may have one or more output portions where light rays may be directed out of the waveguide.

A diffractive surface may be curved or flat. A diffractive surface may comprise one or more of a holographic film, a diffractive grating, and/or other diffractive surfaces.

It is noted that the use of the term "light ray" is not intended to limit the scope of the disclosure to single, discrete, photons and/or packets of photons. Instead, the disclosure may envision a light ray to mean a light beam comprising multiple and continuous photons, in one or more implementations.

In some implementations, one or more optical elements may be arranged on headset 102 such that, when headset 102 is installed on the head of a user, the user's gaze may be directed towards the one or more optical elements. In some implementations, an optical element may form at least part of a portion of headset 102 through which a user may view the real-world. In some implementations, an optical element may comprise one or more reflective and/or partially reflective surfaces. An optical element may be formed from a reflective and/or partially reflective material. An optical element may be formed from a transparent and/or partially transparent material. A material of an optical element may comprise one or more of ZEONEX, Cyclo Olefin Polymer (COP), Cyclic Olefin Copolymer (COC), polycarbonate, Poly (methyl methacrylate) (PMMA), and/or other materials. In some implementations, optical element may comprise one or more of a coaxial vertical concave semi-reflective back visor, a coaxial vertical convex semi-reflective back visor, a coaxial vertical flat semi-reflective back visor, a semi-transparent diffraction grating, and/or other optical elements. The curvature of the optical element may be negative, which may reduce the field-of-view. A negative curvature of the optical element may also increase the eye box. If the curvature of the optical element is 0, the eye relief distance may increase.

In some implementations, an optical element may comprise one or more of a waveguide, optical coupling features, and/or other components of an image-forming component. An optical element may comprise a mask display coupled on the environment side of the optical element. The mask display may be curved or flat. The mask display may be configured to transmit light rays from an ambient environment through the mask display to provide the user with views of the real world through the optical element.

In some implementations, one or more optical elements may be arranged on headset 102 such that, when headset 102 is installed on the head of the user, light rays generated by one or more light sources may be directed onto the one or more optical elements to form images of virtual content on the one or more optical elements. The images on the one or more optical elements may be superimposed over the user's view of the real world through the one or more optical elements to create an interactive environment.

In some implementations, one or more optical elements may be arranged on a headset such that light rays generated by one or more light sources may be directed at the one or more optical elements, coupled into the one or more optical elements, directed out of the one or more optical elements and back into the one or more light-providing components, and directed out of the one or more light-providing components into an eye of a user. The images may be projected onto a retina of an eye such that the images may be superimposed over the user's view of the real world.

Figure 2:
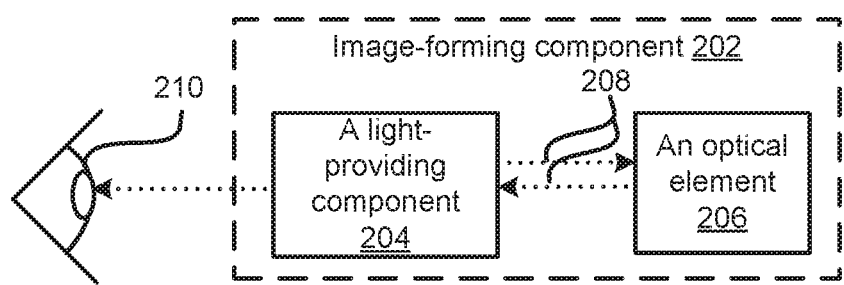
FIG. 2 illustrates a configuration of an image-forming component comprising a light-providing component and an optical element.

FIG. 2 illustrates an implementation of an image-forming component 202. The image-forming component 202 may include one or more of a light-providing component 204, an optical element 206, and/or other components. The optical element 206 may be configured to transmit light rays from an ambient environment through the optical element 206 to provide the user with views of the real world through optical element 206. The light-providing component 204 may be configured to generate light rays to form images, including light ray 208. The light providing component 204 may also be configured to transmit the light rays back through the light-providing component 204. The optical element 206 may be configured to receive the light rays generated by light-providing component 204. The optical element 206 and/or the light-providing component 204 may be configured to guide the light rays to an eye 210 of the user to present the images.

Figure 3:
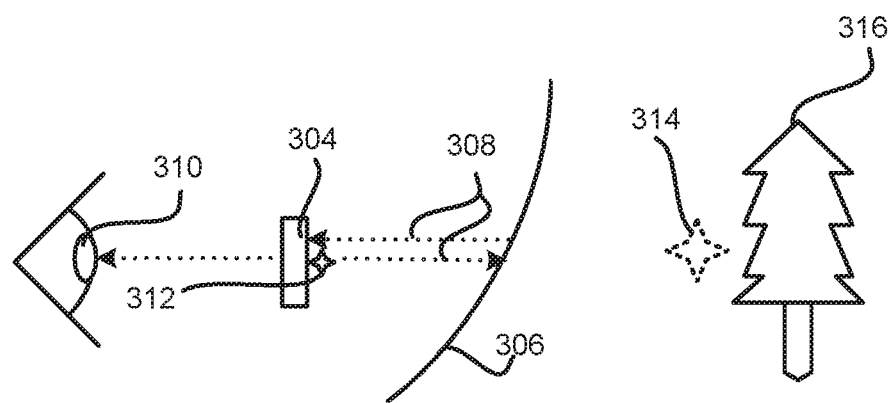
FIG. 3 illustrates a configuration of an image-forming component configured to generate images.

FIG. 3 illustrates a configuration of a light-providing component 304 and an optical element 306 of an image-forming component, in accordance with one or more implementations. The optical element 306 may comprise, and/or may be part of, a visor portion of a device, such as a headset. The optical element 306 may be configured to transmit light rays from an ambient environment through the optical element 306 to provide views of the real world through optical element 306. The light-providing component 304 may be configured to generate light rays, including light ray 308. The light rays may form images, including image 312. The light rays may be received by optical element 306. The light rays may be reflected off optical element 306 and transmitted back through light-providing component 304 before being provided to an eye 310 of a user. The light rays received by eye 310 may form a virtual object 314 perceived to lie within three-dimensional space in the user's field of view. The image 312 forming the virtual object 314 may be superimposed over the user's view of real-world objects, including real-world object 316.

Figure 4:
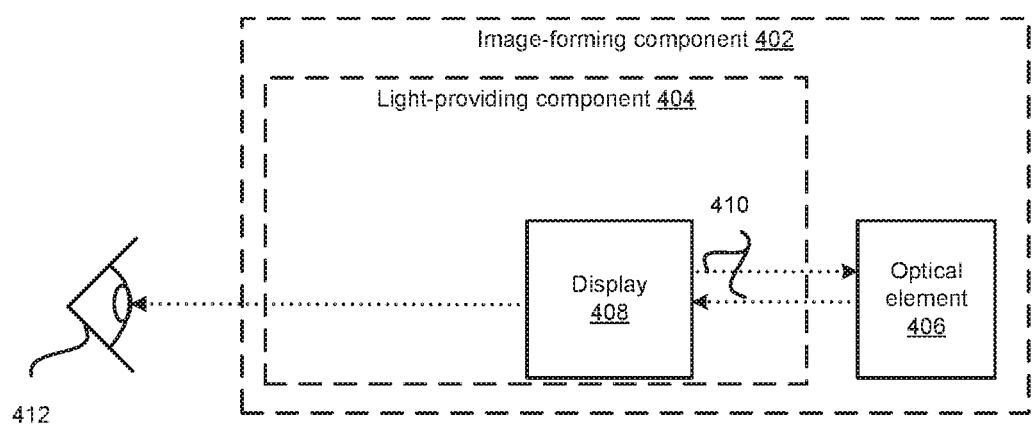
FIG. 4 illustrates a configuration of an image-forming component comprising a light-providing component and an optical element, in accordance with one or more implementations.

FIG. 4 illustrates a configuration of an image-forming component 402 comprising a light-providing component 404 and an optical element 406, in accordance with one or more implementations. The image-forming component 402, light-providing component 404, and/or optical element 406 may be held by a headset (not shown in FIG. 4). The optical element 406 may be configured to transmit light rays from an ambient environment through the optical element 406. The optical element 406 may be configured to receive the light rays generated by light-providing component 404. The optical element 406 may also be configured to guide the light rays to an eye 412 via transmission back through light-providing component 404. The light-providing component 404 may include one or more of a display 408 and/or other components. The display 408 may be configured to emit light rays, including light ray 410, to form images. The light rays 410 may be directed away from the eye 412 and towards the optical element 406. The display 408 may also be configured so that the light rays 410 may be transmitted back through the display 408 from the optical element 406.

Figure 5:
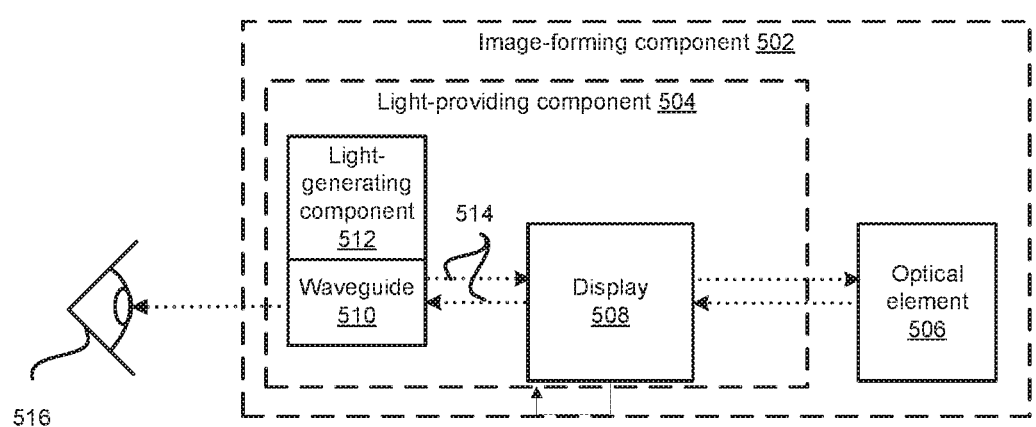
FIG. 5 illustrates a configuration of an image-forming component comprising a light-providing component and an optical element, in accordance with one or more implementations.

FIG. 5 illustrates a configuration of an image-forming component 502 comprising a light-providing component 504 and an optical element 506, in accordance with one or more implementations. The image-forming component 502, light-providing component 504, and/or optical element 506 may be held by a headset (not shown in FIG. 5). The optical element 506 may be configured to transmit light rays from an ambient environment through the optical element 506. The optical element 506 may be configured to receive the light rays generated by light-providing component 504. The optical element 506 may also be configured to guide the light rays to an eye 516 via light-providing component 504. The light-providing component may include one or more of a display 508, a waveguide 510, a light-generating component 512, and/or other light-providing components. The light-generating component 512 may be configured to generate the light rays, including light ray 514. These light rays may be configured to form a backlight coupled into waveguide 510. The display 508 may be configured to transmit light rays 514 through the display 508 to form images. The light rays 514 may be directed away from the eye 516, through the display 508, and towards the optical element 506. The display 508 may be configured so that the light rays 514 may be transmitted back through one or both of display 508 and/or waveguide 510 from the optical element 506.

The waveguide 510 may be configured to receive the light rays from the light-generating component 512 via optical coupling features. In some implementations, optical coupling features may comprise one or more coupling prisms and/or other optical coupling features. The light rays 514 coupled into waveguide 510 may be propagated through waveguide 510 and directed away from the eye 516 and towards display 508 and/or the optical element 506. The waveguide 510 may be configured to selectively output the light rays 514 towards display 508 and/or optical element 506. The waveguide 510 may also be configured to selectively output the light rays 514 at an angle towards display 508 and/or optical element 506. In some implementations, the angle may be between 30 degrees to negative 30 degrees, 0 degrees being perpendicular to the surface of the waveguide. The waveguide 510 may be configured to transmit the light rays reflected off optical element 506 back through the waveguide 510.

In some implementations, light-generating component 512 in FIG. 5 may comprise one or more of a light source, a beam splitter device, a free-form reflective surface, and/or other components. A light source may be configured to emit the light rays, including light ray 514. The beam splitter device may be configured to split the light rays into separate rays or beams. The free-form reflective surface may be configured to reflect the light rays into the waveguide 510 via optical coupling features. The free-form reflective surface may be configured to increase eye relief. The free-form reflective surface may be configured to provide diverging wavefronts. The free-form reflective surface may also be configured to reflect half of image from the light rays into the waveguide 510 at an angle. In some implementations, the angle may be between 30 degrees and negative 30 degrees.

Figure 6:
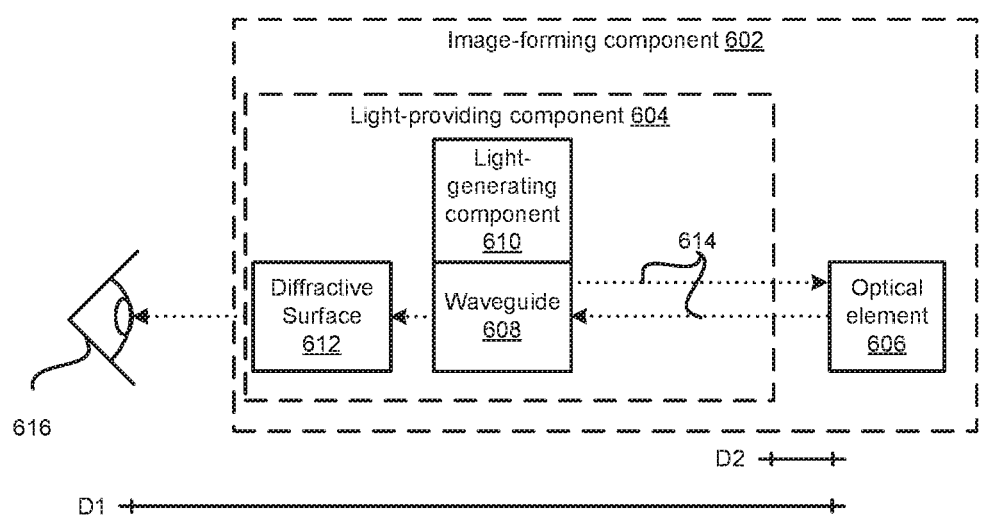
FIG. 6 illustrates a configuration of an image-forming component comprising a light-providing component and an optical element, in accordance with one or more implementations.

FIG. 6 illustrates a configuration of an image-forming component 602 comprising a light-providing component 604 and an optical element 606, in accordance with one or more implementations. The image-forming component 602, light-providing component 604, and/or optical element 606 may be held by a headset (not shown in FIG. 6). The optical element 606 may be configured to transmit light rays from an ambient environment through the optical element 606. The optical element 606 may be configured to receive the light rays generated by light-providing component 604. The optical element 606 may be configured to guide the light rays to an eye 616 via light-providing component 604. The light-providing component may include one or more of a waveguide 608, a light-generating component 610, a diffractive surface 612, and/or other light-providing components. The light-generating component 610 may be configured to generate the light rays, including light ray 614.

In some implementations, the optical element 606 may be a distance D1 from the eye 616 when the device is installed on the head of the user. The optical element 606 may be a distance D2 from the light-providing component 604. The ratio of distance D2 to distance D1 may be a ratio less than one. In some implementations, this ratio can range from 0.05 to 0.5. Depending on the configuration of the light-providing component 604, distance D1 and distance D2 may change to direct the light rays 614 towards the eye 616.

The diffractive surface 612 may be configured to transmit the light rays 614 that have been directed back through the diffractive surface 612. The diffractive surface 612 may also be configured to expand the light rays 614. The diffractive surface 612 may also be configured to induce convergence of the light rays 614. The image-forming component 602 may be configured such that when the headset is installed on the head of the user, the images may be presented. The images may be superimposed over a view of the real world to create at least part of an interactive environment.

Figure 7:
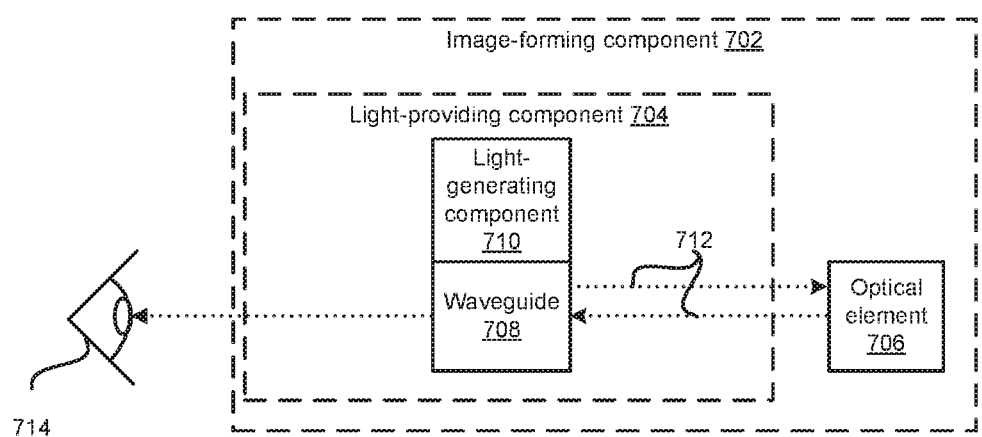
FIG. 7 illustrates a configuration of an image-forming component comprising a light-providing component and an optical element, in accordance with one or more implementations.

FIG. 7 illustrates a configuration of an image-forming component 702 comprising a light-providing component 704 and an optical element 706, in accordance with one or more implementations. The image-forming component 702, light-providing component 704, and/or optical element 706 may be held by a headset (not shown in FIG. 7). The optical element 706 may be configured to transmit light rays from an ambient environment through the optical element 706. The optical element 706 may be configured to receive the light rays generated by light-providing component 704. The optical element 706 may be configured to guide the light rays to an eye 714 via transmission back through light-providing component 704. The light-providing component may include one or more of a waveguide 708, a light-generating component 710, and/or other components. The light-generating component 710 may be configured to generate the light rays 712.

The waveguide 708 may be configured to receive the light rays 712 from the light-generating component 710 via coupling features. In some implementations, optical coupling features may comprise one or more coupling prisms and/or other optical coupling features. The light rays 712 are directed away from the eye 714 and towards the optical element 706. The waveguide 708 may also be configured to selectively output the light rays 712 towards the optical element 706. The waveguide 708 may also be configured to selectively output the light rays 712 at an angle towards the optical element 706. In some implementations, the angle may be between 30 degrees to negative 30 degrees, 0 degrees being perpendicular to the surface of the waveguide. The waveguide 708 may also be configured so that the light rays 712 may be transmitted back through the waveguide 708 from the optical element 706.

FIG. 8-11 show configurations of image-forming components and further showing particular configurations of light-providing components and optical elements of the image-forming components. FIGS. 8-11 are not meant to be limiting. For illustrative purposes, the components depicted in these figures are viewed from a top-down perspective, where the eye (e.g., reference numerals 818 in FIG. 8, 918 in FIG. 9, 1018 in FIG. 10, and 1118 in FIG. 11) is a user's right eye. It is also noted that similar components shown may be used for the left eye of the user, with the components in a mirrored and/or other configuration.

Figure 8:
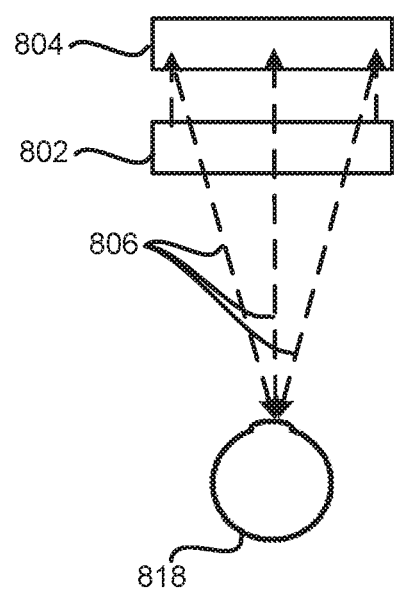
FIG. 8 illustrates a configuration of an image-forming component comprising a light-providing component and an optical element, in accordance with one or more implementations.

FIG. 8 illustrates a configuration of an image-forming component comprising a light-providing component and an optical element, similar to the configuration shown in FIG. 4. The image-forming component and light-providing component may be held by a headset (not shown in FIG. 8). The image-forming component may include one or more of an optical element 804, a light-providing component, and/or other image-forming components. The light-providing component may include one or more of a display 802 and/or other light-providing components. The optical element 804 may be configured to transmit light rays from an ambient environment through the optical element 804. The optical element 804 may be configured to receive the light rays generated by light-providing component. The optical element 804 may also be configured to guide the light rays to an eye of the user to present the images. The display 802 may be configured to emit light rays 806 to form images. The light rays 806 may be directed away from the eye 818 and towards the optical element 804. The display 802 may also be configured so that the light rays 806 may be transmitted back through the display 802 from the optical element 804. The image-forming component may be configured such that when the headset is installed on the head of the user, the images may be presented. The images may be superimposed over a view of the real world to create at least part of an interactive environment.

In some implementations, optical element 804 may comprise one or more of a coaxial vertical concave semi-reflective back visor and/or other optical elements. In some implementations, display 802 may comprise one or more of an LED array with gaps between individual LEDs, a see-through display, and/or other displays. The gaps between individual LEDs may range from 20 microns to 200 microns.

Figure 9:
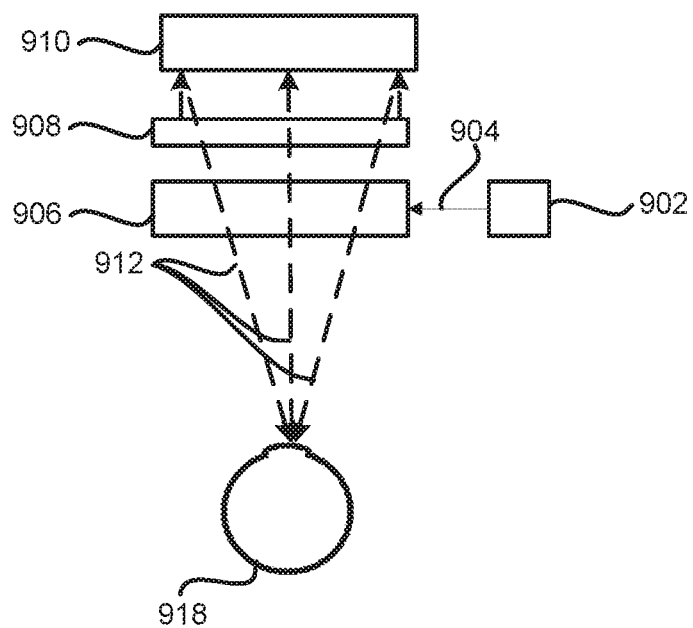
FIG. 9 illustrates a configuration of an image-forming component comprising a light-providing component and an optical element, in accordance with one or more implementations.

FIG. 9 illustrates a configuration of an image-forming component comprising a light-providing component and an optical element, similar to the configuration shown in FIG. 5. The image-forming component and light-providing component may be held by a headset (not shown in FIG. 9). The image-forming component may include one or more of an optical element 910, a light-providing component, and/or other image-forming components. The light-providing component may include one or more of a display 908, a waveguide 906, a light-generating component 902, and/or other light-providing components. The light-generating component 902 may be configured to generate the light rays 912. These light rays 912 may be configured to form a backlight for the display 908. The display 908 may be configured to transmit light rays 912 through the display 908 to form images. The light rays 912 are directed away from the eye 918, through the display 908, and towards the optical element 910. The display 908 may also be configured so that the light rays 912 may be transmitted back through the display 908 from the optical element 910.

The optical element 910 may be configured to transmit light rays from an ambient environment through the optical element 910. The optical element 910 may be configured to receive the light rays generated by light-providing component. The optical element 910 may also be configured to guide the light rays to an eye of the user via reflection of the light rays back through one or both of waveguide 906 and/or display 908.

The waveguide 906 may be configured to receive the light rays 912 from the light-generating component 902 via optical coupling features 904. In some implementations, optical coupling features 904 may comprise one or more coupling prisms and/or other optical coupling features. The light rays 912 may be directed away from the eye 918 and towards the optical element 910. The waveguide 906 may also be configured to selectively output the light rays 912 towards the optical element 910. The waveguide 906 may also be configured to receive light rays reflected from optical element 910 and transmit the light rays 912 back through the waveguide 906.

In some implementations, optical element 910 may comprise one or more of a coaxial vertical concave semi-reflective back visor and/or other optical elements. In some implementations, light-generating component 902 may comprise one or more of a light source, a beam splitter device, a free-form reflective surface, and/or other light-generating components. A light source may be configured to emit the light rays 912. The beam splitter device may be configured to split the light rays into beams. The free-form reflective surface may be configured to reflect the light rays into the waveguide 906.

In some implementations, display 908 may comprise one or more of a non-emissive display, such as an LCD or a TFT LCD, which may have a color matrix filter, and/or other displays. If a color matrix filter is applied, the light source may be white. If no color matrix filter is applied, the light source may be sequential RGB. In some implementations, the light source may comprise one or more of a high power white LED, an RGB LED, and/or other light sources. In some implementations, the beam splitter device may comprise one or more of a beam splitter surface and/or other beam splitter devices. In some implementations, the waveguide 906 may comprise one or more optical coupling features 904. In some implementations, the optical coupling features 904 may comprise one or more coupling prisms and/or other optical coupling features. In some implementations, the waveguide 906 may comprise one or more of a diffractive waveguide, a geometrical waveguide, a holographic waveguide, and/or other waveguides. In some implementations, the waveguide 906 may be configured to output only white light or RGB channels in sequence.

Figure 10:
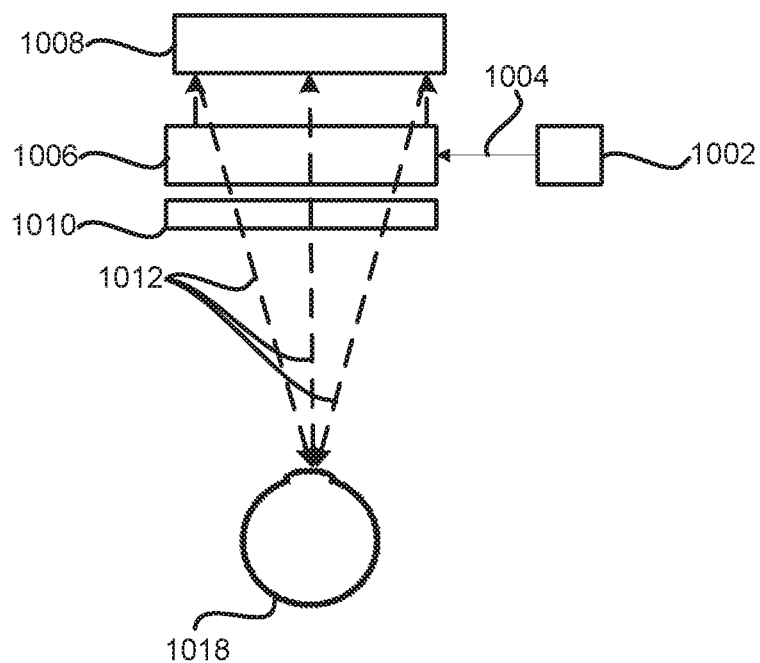
FIG. 10 illustrates a configuration of an image-forming component comprising a light-providing component and an optical element, in accordance with one or more implementations.

FIG. 10 illustrates a configuration of an image-forming component comprising a light-providing component and an optical element, similar to the configuration shown in FIG. 6. The image-forming components and tuning components may be held by a headset (not shown in FIG. 10). The image-forming component and light-providing component may be held by a headset (not shown in FIG. 10). The image-forming component may include one or more of an optical element 1008, a light-providing component, and/or other image-forming components. The light-providing component may include one or more of a waveguide 1006, a light-generating component 1002, a diffractive surface 1010, and/or other light-providing components. The light-generating component 1002 may be configured to generate the light rays 1012 to form images.

The optical element 1008 may be configured to transmit light rays from an ambient environment through the optical element 1008. The optical element 1008 may be configured to receive the light rays generated by light-providing component. The optical element 1008 may also be configured to guide the light rays to an eye of the user to via reflection of the light rays back through one or both of waveguide 1006 and/or diffractive surface 1010.

The waveguide 1006 may be configured to receive the light rays 1012 from the light-generating component 1002 via optical coupling features 1004. In some implementations, optical coupling features 1004 may comprise one or more coupling prisms and/or other optical coupling features. The light rays 1012 may be directed away from the eye 1016 and towards the optical element 1008. The waveguide 1006 may be configured to selectively output the light rays 1012 towards the optical element 1008. The waveguide 1006 may be configured to act as a collimated image carrier. The waveguide 1006 may also be configured to act as a non-collimated image carrier. The waveguide 1006 may be configured to receive light rays reflected from optical element 1008 and transmit the light rays 1012 back through the waveguide 1006 from the optical element 1008.

The diffractive surface 1010 may be configured to receive light rays reflected from optical element 1008 and transmit the light rays 1012 back through the diffractive surface 1010 from the optical element 1008. The diffractive surface 1010 may also be configured to expand the light rays 1012.

In some implementations, optical element 1008 may comprise one or more of a coaxial vertical concave semi-reflective back visor, a coaxial vertical flat semi-reflective back visor, a semi-transparent diffraction grating that provides a same convergence as outgoing light rays, and/or other optical elements. In some implementations, light-generating component 1002 may comprise one or more of a light source, a beam splitter device, a free-form reflective surface, and/or other light-generating components. A light source may be configured to emit the light rays 1012. The beam splitter device may be configured to split the light rays into beams. The free-form reflective surface may be configured to reflect the light rays into the waveguide 1006. The free-form reflective surface may be configured to provide diverging wavefronts.

In some implementations, the light source may comprise one or more laser diodes and/or other light sources. In some implementations, the light source may comprise one or more of an image engine, such as an LCOS or a microdisplay, and/or other light sources. In some implementations, the beam splitter device may comprise one or more of a micro beam splitter to channel light into RGB and/or other beam splitter devices, a beam splitter surface, and/or other beam splitter devices. In some implementations, the free-form reflective surface may comprise one or more of a MEMS scanning micromirror and/or other free-form reflective surfaces. In some implementations, the diffractive surface 1010 may be one or more of a holographic film, a diffraction grating, and/or other diffractive surfaces. In some implementations, the diffractive surface may be configured to induce convergence for the light rays reflected off the optical element. In some implementations, the waveguide 1006 may comprise one or more of a geometrical waveguide and/or other waveguides.

Figure 11:
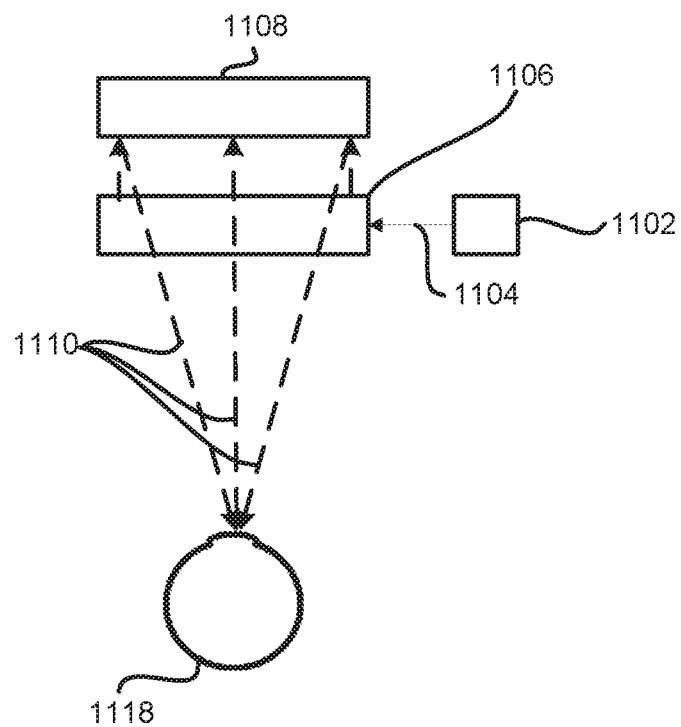
FIG. 11 illustrates a configuration of an image-forming component comprising a light-providing component and an optical element, in accordance with one or more implementations.

FIG. 11 illustrates a configuration of an image-forming component comprising a light-providing component and an optical element, similar to the configurations shown in FIG. 7. The image-forming component and light-providing component may be held by a headset (not shown in FIG. 11). The image-forming component may include one or more of an optical element 1108, a light-providing component, and/or other image-forming components. The light-providing component may include one or more of a waveguide 1106, a light-generating component 1102, and/or other light-providing components. The light-generating component 1102 may be configured to generate the light rays 1110.

The optical element 1108 may be configured to transmit light rays from an ambient environment through the optical element 1108. The optical element 1108 may be configured to receive the light rays generated by light-providing component. The optical element 1108 may also be configured to guide the light rays to an eye of the user via reflection of the light rays back through waveguide 1106.

The waveguide 1106 may be configured to receive the light rays 1110 from the light-generating component 1102 via coupling features 1104. In some implementations, optical coupling features may comprise one or more coupling prisms and/or other optical coupling features. The light rays 1110 may be directed away from the eye 1118 and towards the optical element 1108. The waveguide 1106 may also be configured to selectively output the light rays 1110 towards the optical element 1108. The waveguide 1106 may also be configured to selectively output the light rays 1110 at an angle towards the optical element 1108. In some implementations, the angle may be between 30 degrees to negative 30 degrees, 0 degrees being perpendicular to the surface of the waveguide. In some implementations, the waveguide may comprise one or more waveguides directed to one eye. A first set of one or more waveguides may output the first set of light rays at an angle towards the optical element, and the second set of one or more waveguides may output the second set of light rays at an angle towards the optical element. In some implementations, the first set of one or more waveguides may output the first set of light rays at an angle between 30 degrees to 0 degrees, 0 degrees being perpendicular to the surface of the individual waveguides. In some implementations, the second set of one or more waveguides may output the second set of light rays at an angle between negative 30 degrees to 0 degrees, 0 degrees being perpendicular to the surface of the individual waveguides. The waveguide 1106 may also be configured receive light rays reflected from optical element 1108 and transmit the light rays 1110 back through the waveguide 1106 from the optical element 1108.

In some implementations, optical element 1108 may comprise one or more of a coaxial vertical concave semi-reflective back visor, a coaxial vertical convex semi-reflective back visor, a semi-transparent diffraction grating that provides a same convergence as outgoing light rays, and/or other optical elements. In some implementations, light-generating component 1102 may comprise one or more of a light source, a beam splitter device, a free-form reflective surface, and/or other light-generating components. A light source may be configured to emit the light rays 1110. The beam splitter device may be configured to split the light rays into beams. The free-form reflective surface may be configured to reflect the light rays into the waveguide 1106. The free-form reflective surface may be configured to increase eye relief. The free-form reflective surface may also be configured to reflect half of the image from the light rays into the waveguide 1106 at an angle. In some implementations, this angle may be configured such that the angle value supports total internal reflection in the waveguide. In some implementations, this angle may be greater than 45 degrees, 0 degrees being perpendicular to the surface.

In some implementations, the light source may comprise one or more laser diodes, a feed light engine, and/or other light sources. In some implementations, the waveguide may comprise one or more of a geometrical waveguide configured to act as a world-exiting waveguide and/or other waveguides.

Returning to FIG. 1, one or more physical computer processors 104 may be configured by machine-readable instructions 106. Executing machine-readable instructions 106 may cause one or more physical computer processors 104 to facilitate providing an interactive environment. The machine-readable instructions 106 may include one or more of a content component 108, a control component 110, and/or other components.

In some implementations, content component 108 may be configured to determine virtual content to present to a user. Virtual content may include one or more virtual objects and/or other virtual content. Virtual content may be in the form of digital imagery generated by one or more image-forming components 114.

In some implementations, control component 110 may be configured to control individual ones of one or more image-forming components 114, and/or other components. Controlling one or more image-forming components 114 may include controlling light-providing components, optical elements, and/or other components. Controlling light-providing components may include controlling light rays on their return path from an optical element. The light-providing component may affect the brightness, color, intensity, direction, and/or other features of the light rays. Controlling light-providing components may include spatially modulating the light rays by changing the polarization of the light rays. In some implementations, the light rays may go through a diffractive layer which may compensate for color inaccuracies.

One or more light-providing components may be controlled to generate light rays in accordance with virtual content to be presented to the user. One or more light-providing components may be controlled to generate light rays in accordance with intended resolutions of the images to be presented to the user. The virtual content may be perceived by the viewing user to lie within three-dimensional real space. By way of non-limiting illustration, a light-providing component may generate light rays to form a digital image, which when directed into a user's eyes, may be perceived as virtual content in three-dimensional space.

In some implementations, control component 110 may be configured to control image-forming components and/or sets of image-forming components in response to information provided to one or more light-providing components, light-generating components, and/or other components.

In some implementations, one or more of processor(s) 104, one or more image-forming components 114, external resources 116, and/or other components may be operatively linked via one or more electronic communication links. For example, such electronic communication links may be established, at least in part, via network(s) 119. Network(s) 118 may comprise one or both of wired or wireless communications. It will be appreciated that this is not intended to be limiting and that the scope of this disclosure includes implementations in which processor(s) 104, one or more image-forming components 114, external resources 116, and/or other components may be operatively linked via some other communication media.

The external resources 116 may include sources of information, hosts, external entities participating with system 100, providers of virtual content, and/or other resources. In some implementations, some or all of the functionality attributed herein to external resources 116 may be provided by resources included in system 100.

The processor(s) 104 may include and/or have access to electronic storage 112, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 112 may comprise non-transitory electronic storage media that electronically stores information. The electronic storage media of electronic storage 112 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 112 may include one or more virtual storage resources (e.g., cloud storage, a virtual private network, and/or other virtual storage resources). Electronic storage 112 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a physical computer processor, a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, and/or other components. Processor(s) 104 may be configured to execute component 108, 110, and/or other components by software; hardware; firmware; some combination of software, hardware, and/or firmware; and/or other mechanisms for configuring processing capabilities on processor(s) 104.

It should be appreciated that although components 108 and 110 are illustrated in FIG. 1 as being co-located within a single processing unit, in implementations in which processor(s) 104 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 104 may be configured to execute one or more additional components that may perform some or all of the functionality attributed to individual ones of components 108, 110, and/or other components.

Figure 13:
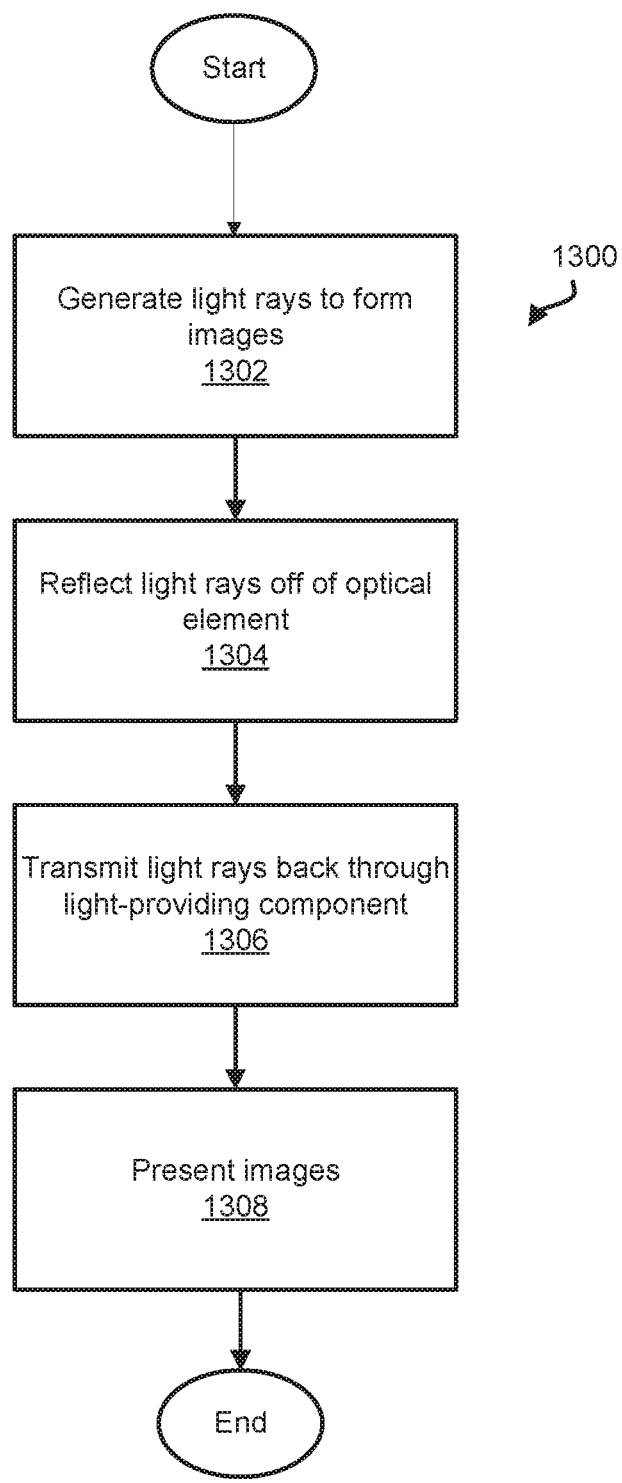
FIG. 13 illustrates a method to provide an interactive environment, in accordance with one or more implementations.

FIG. 13 illustrates a method 1300 to provide an interactive environment, in accordance with one or more implementations. The operations of method 1300 presented below are intended to be illustrative. In some implementations, method 1300 may be accomplished with one or more additional operations not described, and/or without one or more of the operations discussed. Additionally, the order in which the operations of method 1300 are illustrated in FIG. 13 and described below is not intended to be limiting.

In some implementations, method 1300 may be implemented in and/or using a system, such as system 100 shown in FIG. 1 and described herein. In particular, method 1300 may be implemented using a device configured to be installed on a head of a user, such as headset 102 shown in FIG. 1 and described herein. The headset may comprise one or more of one or more physical computer processors, one or more image-forming components, and/or other components. The one or more physical computer processors may include one or more devices executing one or more of the operations of method 1300 in response to instructions stored electronically on electronic storage media. The one or more processing devices may include one or more devices configured through hardware, firmware, and/or software to be specifically designed for execution of one or more of the operations of method 1300.

At an operation 1302, light rays may be generated to form images. In some implementations, operation 1302 may be performed using one or more of an image-forming component the same as or similar to an individual one of one or more image-forming components 114, one or more physical computer processors executing a control component the same as or similar to control component 110, and/or other components (shown in FIG. 1 and described herein).

At an operation 1304, light rays may be reflected off an optical element. In some implementations, operation 1304 may be performed using one or more of an image-forming component the same as or similar to an individual one of one or more image-forming components 114, one or more physical computer processors executing a control component the same as or similar to control component 110, and/or other components (shown in FIG. 1 and described herein).

At an operation 1306, light rays may be transmitted back through a light-providing component. In some implementations, operation 1306 may be performed using one or more of an image-forming component the same as or similar to an individual one of one or more image-forming components 114, one or more physical computer processors executing a control component the same as or similar to control component 110, and/or other components (shown in FIG. 1 and described herein).

At an operation 1308, light rays may be presented to form images of virtual content. The images may be superimposed over a view of the real world to create an interactive environment. In some implementations, operation 1308 may be performed using one or more of an image-forming component the same as or similar to an individual one of one or more image-forming components 114, one or more physical computer processors executing a control component the same as or similar to control component 110, and/or other components (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide an interactive environment, the system comprising:
    a device configured to be installed on a head of a user;
    an image-forming component held by the device configured to generate light rays to form images, the image-forming component being configured such that when the device is installed on the head of the user, (i) the images are presented to the user and (ii) the images are superimposed over the view of the real world, wherein the image-forming component comprises:
        a light-providing component configured to generate the light rays to form the images;
        an optical element configured to receive the light rays generated by the light-providing component and guide the light rays to an eye of the user to present the images; and
    one or more physical computer processors configured by machine-readable instructions to:
        control the image-forming component to generate the light rays to form the images,
    wherein the light-providing component comprises:
        a light-generating component configured to generate the light rays to form the images;
        a waveguide having optical coupling features, the waveguide being configured to receive the light rays from the light-generating component via the optical coupling features and to selectively output the light rays received from the light-generating component towards the optical element;
        a diffractive surface coupled with the waveguide configured to expand the light rays coming back through the waveguide; and
    wherein the waveguide is positioned between the eye and the optical element when the device is installed on the head of the user, and the diffractive surface is positioned between the eye and the waveguide when the device is installed on the head of the user, such that the waveguide directs the light rays away from the eye and towards the optical element, and wherein the optical element then reflects the light rays back through the waveguide and the diffractive surface towards the eye of the user.

2. The system of claim 1, wherein the light-generating component comprises:
    a light source configured to generate the light rays to form the images;
    a beam splitter device configured to split the light rays and direct the light rays to a micromirror; and
    the micromirror configured to reflect the split light rays into the waveguide via the optical coupling features.

3. The system of claim 2, wherein the micromirror comprises a microelectromechanical systems (MEMS) scanning micromirror.

4. The system of claim 1, wherein the diffractive surface is configured to induce convergence of the light rays towards the eye.

5. The system of claim 1, wherein the optical element is a first distance from the eye when the device is installed on the head of the user, and optical element is a second distance from the light-providing component, and wherein the ratio of the second distance to the first distance is a first ratio less than one.

6. A method to provide an interactive environment, the method being implemented in a system comprising an image forming component held by a device configured to be installed on a head of a user, one or more physical computer processors, the image forming component having a light-providing component held by the device, and an optical element held by the device, and storage media storing machine-readable instructions, the method comprising:
    generating, by the light-providing component, light rays to form images;
    reflecting, by the optical element, the light rays back through the light-providing component towards the eye of the user,
    wherein the light-providing component comprises a light-generating component configured to generate the light rays to form the images, a waveguide having optical coupling features, and a diffractive surface coupled with the waveguide, the method further comprising:
        receiving, by the waveguide, the light rays via the optical coupling features and
        selectively outputting the light rays towards the optical element;
        expanding, by the diffractive surface, the light rays coming back through the waveguide; and
        wherein the waveguide is positioned between the eye and the optical element when the device is installed on the head of the user, and the diffractive surface is positioned between the eye and the waveguide when the device is installed on the head of the user, such that the waveguide directs the light rays away from the eye and towards the optical element, and wherein the optical element then reflects the light rays back through the waveguide and the diffractive surface towards the eye of the user.

7. The method of claim 6, wherein the light-generating component comprises a light source configured to generate the light rays to form the images, a beam splitter device, and a micromirror, the method further comprising:
    splitting, by the beam splitter device, the light rays and directing the light rays to the micromirror, and
    reflecting, by the micromirror, the split light rays into the waveguide via the optical coupling features.

8. The method of claim 7, wherein the micromirror comprises a microelectromechanical systems (MEMS) scanning micromirror.

9. The method of claim 6, wherein the diffractive surface is configured to induce convergence of the light rays towards the eye.

10. The method of claim 6, wherein the optical element is a first distance from the eye when the device is installed on the head of the user, and the optical element is a second distance from the light-providing component, and wherein the ratio of the second distance to the first distance is a first ratio less than one.

* * * * *